Dec. 21, 1954   J. H. KINDELBERGER   2,697,390
PHOTOGRAPHIC CAMERA HAVING HINGED FLASH LAMP REFLECTOR
Filed April 12, 1949   2 Sheets-Sheet 1
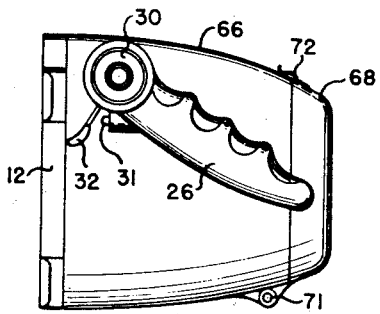
Fig. 1
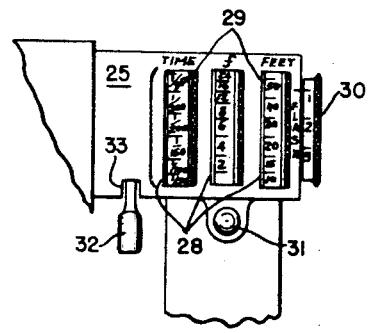
Fig. 3
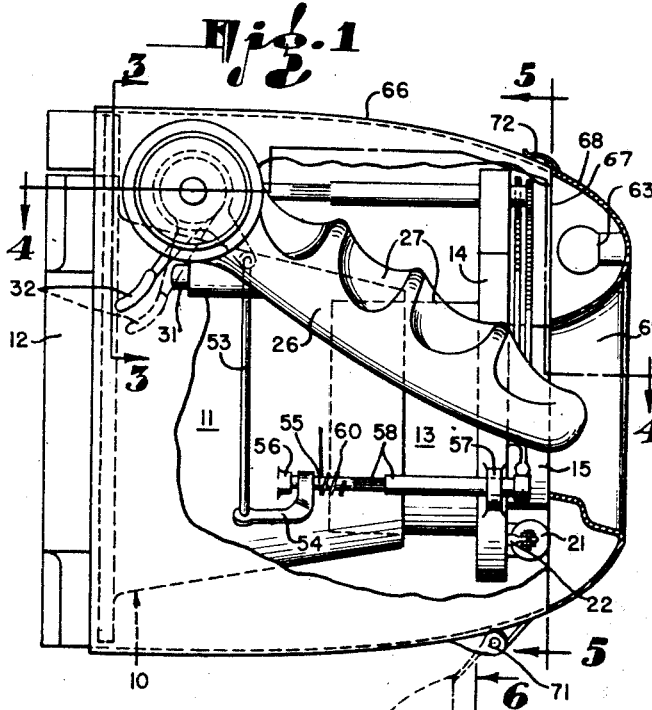
Fig. 2
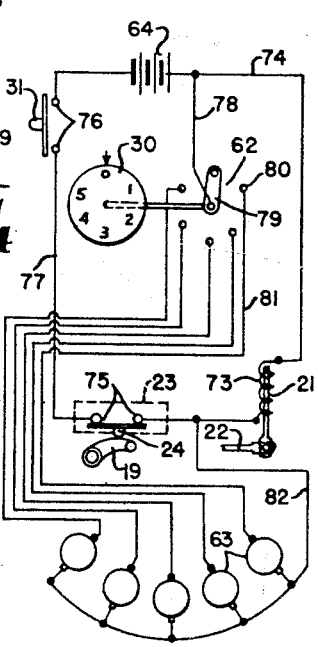
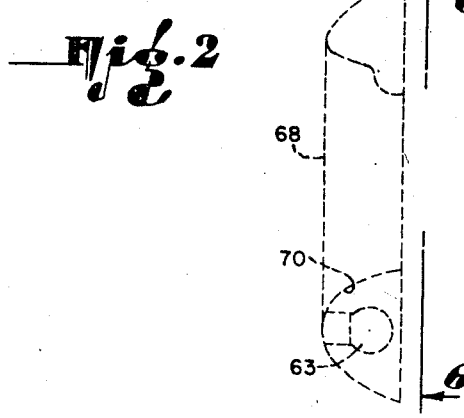
Fig. 7
INVENTOR.
JAMES H. KINDELBERGER
BY
ATTORNEY Dec. 21, 1954 J. H. KINDELBERGER 2,697,390
PHOTOGRAPHIC CAMERA HAVING HINGED FLASH LAMP REFLECTOR
Filed April 12, 1949 2 Sheets-Sheet 2
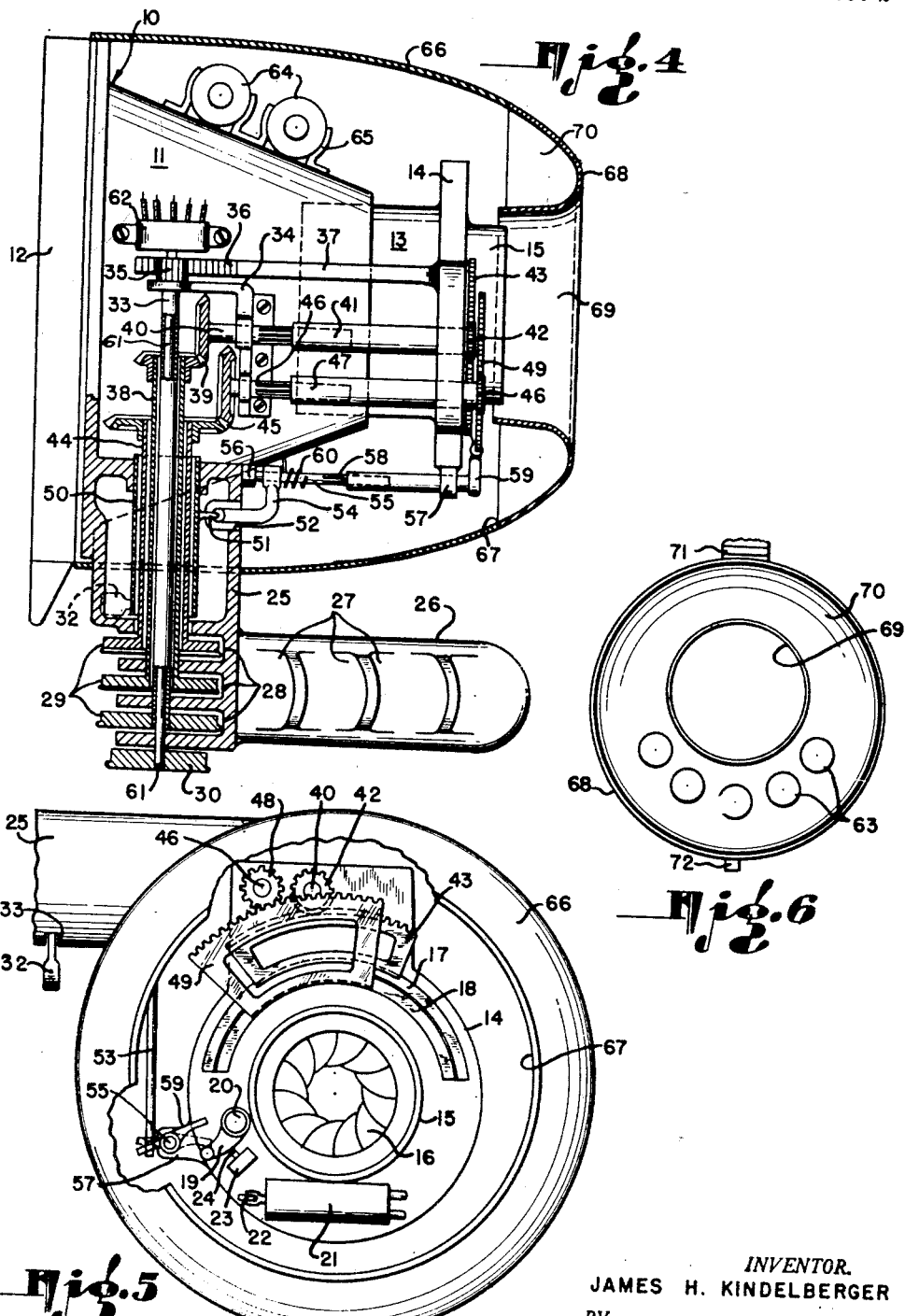
INVENTOR.
JAMES H. KINDELBERGER
BY
ATTORNEY

United States Patent Office

2,697,390
Patented Dec. 21, 1954

2,697,390

PHOTOGRAPHIC CAMERA HAVING HINGED FLASH LAMP REFLECTOR

James H. Kindelberger, Pacific Palisades, Calif.

Application April 12, 1949, Serial No. 86,913

3 Claims. (Cl. 95—11)

The present invention relates generally to a photographic camera and is more particularly concerned with mechanism for supporting a camera in a position of use, and for controlling its various photographic characteristics.

One object of the present invention is to provide in a photographic camera an improved hand grip by which the camera may be supported by a user in a position of use; which requires the use of only one hand; and in which the hand grip is angularly so positioned that it may be gripped with the forearm bent and the palm of the gripping hand upward. This provides a natural position which permits the camera to be held steady for relatively long periods without tiring the arm and hand muscles.

A further object of the herein described invention is to provide in connection with a hand grip for supporting the camera, associated digitally operable control members within easy reach of a user's thumb while gripping the hand grip, these members being selectively operable to control the photographic characteristics of the camera. The designation photographic characteristics is utilized herein as generally referring to the "focus," "stop opening," "time of exposure," "shutter actuation," "energization of flash bulbs," or other operation which may affect in some manner the picture which is obtained on the film, plate, or other media.

Still another object of the invention is to provide a photographic camera having a housing or casing so arranged that a portion may be moved from one position wherein it functions as a part of the casing, to another position wherein the portion serves as a reflector for one or more flash bulbs carried thereby.

Still another object of the herein described invention is to provide in connection with a photographic camera, an improved control system for simultaneously controlling the shutter and energization of one or more selectable flash bulbs.

Further objects of the invention will be brought out in the following part of the specification, wherein detailed description is for the purpose of fully disclosing the invention without placing limitations on the scope of the invention defined in the appended claims.

Referring to the drawings, which are for illustrative purposes only:

Fig. 1 is a side elevational view of a camera embodying the features of the present invention;

Fig. 2 is an enlarged similar view having cutout portions in the housing for disclosing pertinent details of construction, and relationship of parts;

Fig. 3 is an enlarged rear fragmentary view in elevation showing the digitally selectable members for varying and controlling the photographic characteristics of the camera, as seen from line 3—3 of Fig. 2;

Fig. 4 is a sectional view taken substantially on line 4—4 of Fig. 2;

Fig. 5 is a front elevational view having portions of the housing cut away to disclose certain parts, taken substantially on line 5—5 of Fig. 2;

Fig. 6 is a front elevational view of the housing objective end cover as it appears in open position of use, when viewed substantially along line 6—6 of Fig. 2; and Fig. 7 is a schematic wiring diagram of the electrical control system for the shutter mechanism, selection of flash bulbs and energization thereof.

Referring now to the drawings, for purposes of illustration the camera embodying the features of the present invention is disclosed as comprising a body structure, as generally indicated by the numeral 10, which includes a tubular inner housing 11 arranged to communicate at its rear end with a plate or film holder 12 of conventional construction. The forward end of the housing 11 slidably supports a tubular extension 13 which includes a housing 14 for a shutter mechanism, and an objective or lens mount 15. The tubular extension, shutter housing and lens mount are aligned on the objective axis of the camera and axial movement of the tubular extension 13 serves to focus the object with respect to the film or plate in conventional manner.

As shown in Fig. 5, there is associated with the lens mount a conventional iris 16 of suitable construction, which is adjustable to vary the stop opening in the usual manner. Conventional mechanism may be employed to accomplish adjustment of the iris parts, and in the present instance is disclosed as including a ring member 17 arranged for rotation in opposite directions to increase and decrease the stop opening.

Timing mechanism for the shutter is not disclosed in detail, as conventional mechanisms for such purpose are readily available and well known in the art. For purposes of illustration, the timing mechanism is illustrated as including in the present invention a rotatably mounted ring member 18, movement of this member in one direction being arranged to increase the time interval, and in the opposite direction to decrease the time interval. While it is possible to utilize various shutter control arrangements in connection with the present invention, for purposes of illustration, the shutter control mechanism is disclosed as constituting the type which is preset by suitable cocking means which is shown as including a cocking lever 19 pivoted at one end as shown at 20 on the shutter housing for swinging movement, this cocking lever being retained in cocked position in the conventional manner, when moved from uncocked to cocked position, and adapted to move back to uncocked position when the shutter is tripped. The shutter tripping mechanism is arranged to be actuated by a small electric solenoid 21 which is connected to a tripping lever 22 in such manner that energization of the solenoid acts to move the tripping lever to a position wherein the shutter will be released for actuation. The control circuit for this solenoid, as will hereinafter be explained in detail, includes interlocking switch contacts embodied in a switch 23 having a part 24 adapted to be engaged by the cocking lever, when the cocking lever is moved to cocked position. When thus engaged, the part 24 acts to close normally open contacts within the switch.

From the description thus far, it will be noted that the camera embodies conventional mechanism for varying the photographic characteristics of "time of exposure," "stop opening," "focus," "cocking and tripping" of the shutter, such variations being effected at the objective or lens mount of the camera.

In carrying out the present invention, it is proposed to provide a hand grip by means of which the camera may be supported and directed by a single hand of the user, and to associate with this hand grip digitally operable members which may be selectively varied by a finger of the user's hand, such as his thumb, while continuing to grasp the hand grip.

More specifically, as shown in Figs. 2 and 4, one manner in which the invention may be carried out has been illustrated. The body structure of the camera is provided with a laterally extending tubular projection 25 having its axis disposed at right angles to the objective axis of the camera, and positioned above the objective axis. Adjacent the outermost end of the projection 25, there is provided a hand grip 26 which in this instance is integrally formed with the projection 25. The axis of the grip 26 is positioned with respect to the objective axis of the camera at an angle less than 90°, and may be fluted or grooved on its upper surface, as shown at 27, to receive the fingers of the user's hand. The longitudinal axis of the hand grip is disposed at such an angle that it permits supporting the camera in a position of use with the forearm bent and the palm of the gripping hand upward. The user's hand and arm are thus disposed in a position such that the camera is brought into relatively close proximity to the body of the user and may be more steadily supported, and with a minimum of fatigue.

At the junction of the projection 25 and the hand grip 26, there are provided a plurality of spaced recesses 28 within which rotatable discs 29 are respectively positioned with a portion of their peripheries projecting from the recesses so that they may be engaged by the thumb of a user's hand as it grips the hand grip 26, thus enabling the user to selectively rotate each disc 29 when desired.

As shown in Fig. 3, the discs 29 are provided with suitable indicia and graduations for indicating variations in the respective photographic characteristics of the camera. For example, the left hand disc as viewed in Fig. 3, may have indicia indicative of time settings, the middle disc indicia of stop settings, and the right hand disc focusing indicia such as the distance in feet to the object.

At the extreme right end, there is provided an additional disc 30 which is provided with indicia for selectively indicating a plurality of flash bulbs.

Further controls for operating the camera are positioned for easy actuation by the user's thumb while gripping the hand grip. Just below the discs 29 there is provided a push button 31 which is arranged to release the shutter of the camera after it has been preset by cocking. A cocking lever 32 is adjacently disposed to the push button 31, this lever extending through a slot 33 into the projection 25 where it connects with motion transmitting parts, as will hereinafter be explained.

Various connection means may be utilized for transmitting the respective movements of the discs 29 and 30, the push button 31 and cocking lever 32 to the respective photographic characteristics to be effected at the objective or lens mount. For illustrative purposes, the disc 29 utilized for focusing the camera is connected to a torque shaft 33 which extends longitudinally of the projection 25 and is rotatably supported at its innermost end in a bearing bracket 34, this end of the shaft being provided with a pinion 35 operatively meshing with a rectilinear rack 36 at one end of a member 37 which is secured to the shutter housing 14. With this arrangement, rotation of the disc 29 will turn the pinion 35 and through the rack 36 longitudinally reciprocate the member 37 so as to vary the spacing of the lens mount 15 with respect to the plate or film of the camera.

The disc 29 for adjusting the stop opening of the camera is connected to a torque shaft 38 which is connected through a set of meshing bevel gears 39 with a shaft 40 at right angles to the torque shaft 39 and rotatably supported in the bearing bracket 34. The shaft 40 is provided with a splined connection 41 therein to permit variations in the shaft length under focusing operations. The other end of the shaft 40 connects with a small spur gear 42 which meshes with a sector gear 43 carried by ring member 17 of the iris adjusting mechanism.

The disc 29 for adjusting the time interval is carried by a rotatably supported torque shaft 44 which is connected through a set of bevel gears 45 with a shaft 46 at right angles to the shaft 44, and supported for rotation in the bearing bracket 34. The shaft 46 is likewise provided with a splined connection as shown at 47, and connected at its other end to a small spur gear 48 which meshes with a sector gear 49 carried by ring member 18 of the shutter time adjusting mechanism.

The cocking lever 32 connects with one end of a torque shaft 50 supported within the projection 25 for rotational movement and carrying a projecting arm 51 adjacent its other end which projects through a slot opening 52 and is pivotally connected to one end of a connector rod 53. The other end of this connector rod connects with an angular lever in the form of a crank arm 54 carried by a rotatably mounted shaft 55. One end of the shaft 55 is supported in a bearing 56 on the inner housing 11, and the other end of the shaft is rotatably supported in a bearing lug 57 carried by the shutter housing 14, the shaft 55 being provided with a splined connection 58. The forward end of the shaft 55 carries a lever arm 59 which is adapted upon swinging movement in a clockwise direction as viewed in Fig. 5 to engage the outermost end of cocking lever 19 and move it towards cocked position. A coiled spring 60, as shown in Fig. 2, acts to bias the rotation of shaft 55 in a counterclockwise direction and return the lever arm 59 to normal position as shown in full lines.

In the previously described arrangement, it will be noted in Fig. 4 of the drawings that the torque shafts 33, 38, 44, and 50 are of tubular construction so that they may be mounted in concentric relation, thus saving space and concentrating the shafts within a small area.

The disc 30 is connected with a shaft 61 which is carried through the tubular torque shaft 33 to a switch housing 62 containing contacts for selectively connecting flash bulbs 63 into an energizing circuit from an electrical source which may consist of a plurality of dry cells 64 supported in mounting clips 65 on the wall of the inner housing 11.

The camera body and associated parts are enclosed within a generally tubular external housing 66 having an open end 67 at the forward end of the camera, this opening being associated with a hinged closure member 68 of annular formation. The closure is dished and has its outer periphery so formed that it will in effect form a continuation of the wall surface of the housing 66 at its open end. The inner periphery of the closure is deflected inwardly to form a flanged opening 69 which is flared outwardly. It will be noted by reference to Figs. 2 and 4 that the closure construction provides an inner trough 70 around the opening 69 which is so shaped as to form a reflecting area within which a plurality of flash bulbs 63 may be mounted as shown in Fig. 6. The closure member 68 is connected to the housing 66 by means of a hinge 71 which permits swinging movement of the closure from full line closed position as shown in Fig. 2 to open position as shown by dotted lines in Fig. 2. The closure member is arranged to be retained in closed position by means of a snap or spring latch 72. The flash bulbs are concealed from view in the closed position of the closure member 68, but in its open position are exposed for use, the inner trough 70 and its reflecting surface being disposed in a direction facing the object to be photographed.

Referring now to Fig. 7, the electrical connections are shown for cocking and releasing the shutter, and selecting and energizing the flash bulbs. As shown, a solenoid coil 73 of the solenoid tripping means 21 has one side connected through a conductor 74 with the electrical source 64, and its other side connected through contacts 75 of switch 23, and contacts 76 associated with push button 31, by a conductor 77 with the other side of the electrical source 64. The flash bulbs 63 are connected in a plurality of selectable parallel circuits with the solenoid 73 of the tripping solenoid 21. A conductor 78 connects the conductor 74 with a movable contact 79 of selector switch 62, which is adapted to be selectively moved into contact with stationary contacts 80 by the actuation of discs 30, each of the stationary contacts 80 being connected by a conductor 81 to one side of a flash bulb, the other side being connected to a common conductor 82 which is connected to conductor 77 between the contacts of switch 23 and the connection with coil 73.

In the arrangement just described, it will be observed that the contacts 75 of switch 23 are only closed when the shutter mechanism is in cocked condition, and that since the contacts 76 of push button 31 are normally open, the camera must be cocked before it may be tripped by closing the contacts of switch 31. Closing the switch 31 normally energizes the coil 73 of solenoid 21 so as to actuate the shutter tripping mechanism through the tripping lever 22. One of the contact points 80 of the selector switch is not connected to a conductor 81, and this contact point is the zero position of the selector switch, so that in this position none of the flash bulbs will be energized. However, by selecting a given stationary contact 80 by actuation of disc 30 in accordance with the indicia thereon, the flash bulbs may be cut into the circuit so as to be energized simultaneously with the tripping solenoid coil 73, when desired.

I claim:

1. A photographic camera, comprising: a tubular housing including an annular closure portion hingedly mounted for swinging movement at the objective end of the camera, said closure having a dished inner reflecting surface area and a central axial opening in alignment with the lens of said camera; a flash bulb mounted in said reflecting surface area for unitary movement with said closure, said reflecting surface area and bulb being exposed for use in the open position of the closure, and concealed within the housing in the closed position of the closure.

2. A photographic camera, comprising: a housing including a hinged closure at its objective end defining an opening and having a dished inner surface, said closure in closed position having said opening axially aligned with the objective axis of the camera to enable normal photographiing of an object therethrough, and in open position having said dished inner surface facing in the same direction as the camera to form a flash reflector; a plurality of flash bulbs mounted in front of said dished surface; and means for energizing said flash bulbs.

3. A photographic camera, comprising: a housing including a hinged closure at the lens end of the camera, said closure having an annular dished rear surface surrounding a central axial opening in alignment with the camera lens through which an object may be photographed with said closure in closed position; and a flash bulb carried by said closure positioned in front of the dished surface, said bulb being concealed in the housing when the closure is in closed position and exposed for illuminating an object forwardly of the lens, when the closure is moved to open position.

References Cited in the file of this patent

UNITED STATES PATENTS

| Number | Name | Date |
|---|---|---|
| 624,693 | Sheffield | May 9, 1899 |
| 1,246,328 | Rutzen | Nov. 13, 1917 |
| 1,968,597 | Blake | July 31, 1934 |
| 1,972,000 | Warner | Aug. 28, 1934 |
| 2,191,402 | Saffir et al. | Feb. 20, 1940 |
| 2,256,354 | Riddell | Sept. 16, 1941 |
| 2,261,953 | Brown | Nov. 11, 1941 |
| 2,290,793 | Alderman | July 21, 1942 |
| 2,292,044 | Bucky | Aug. 4, 1942 |
| 2,293,784 | Werner | Aug. 25, 1942 |
| 2,314,829 | Hunter | Mar. 23, 1943 |
| 2,344,645 | Schwarz | Mar. 21, 1944 |
| 2,370,611 | Du Mais | Feb. 27, 1945 |
| 2,388,995 | Pollock | Nov. 13, 1945 |
| 2,414,083 | Borden | Jan. 14, 1947 |
| 2,439,417 | Castedello | Apr. 13, 1948 |
| 2,472,823 | Harlow | June 14, 1949 |
| 2,482,571 | Arnold | Sept. 20, 1949 |
| 2,514,991 | Doyle et al. | July 11, 1950 |
| 2,536,490 | Castedello | Jan. 2, 1951 |
| 2,556,967 | Hineline | June 12, 1951 |

OTHER REFERENCES

American Cinematographer, November 1942, pages 474, 475, 489 and 490.